Figure 4:
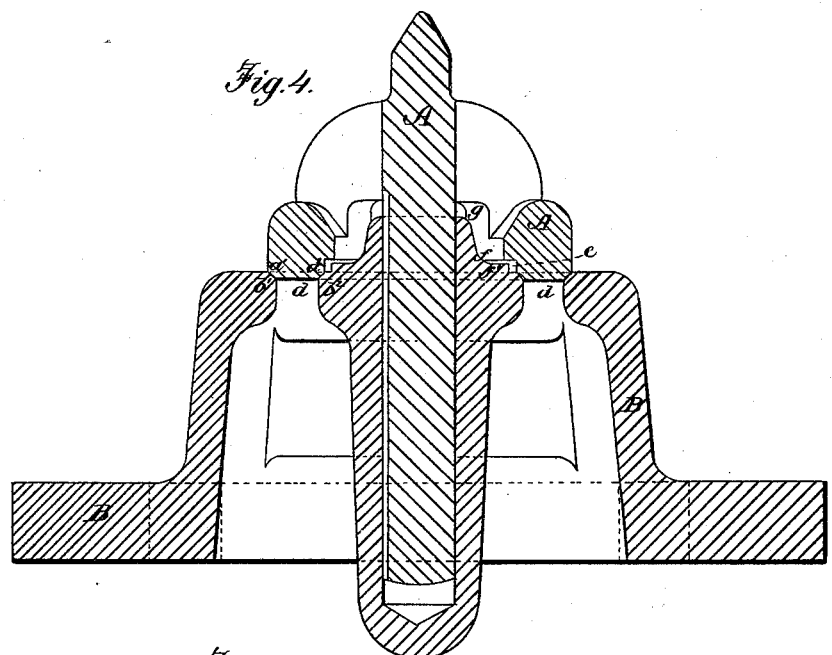

2 Sheets—Sheet 1.
J. W. MELLING.
SAFETY AND RELIEF VALVE.
No. 170,757.   Patented Dec. 7, 1875.
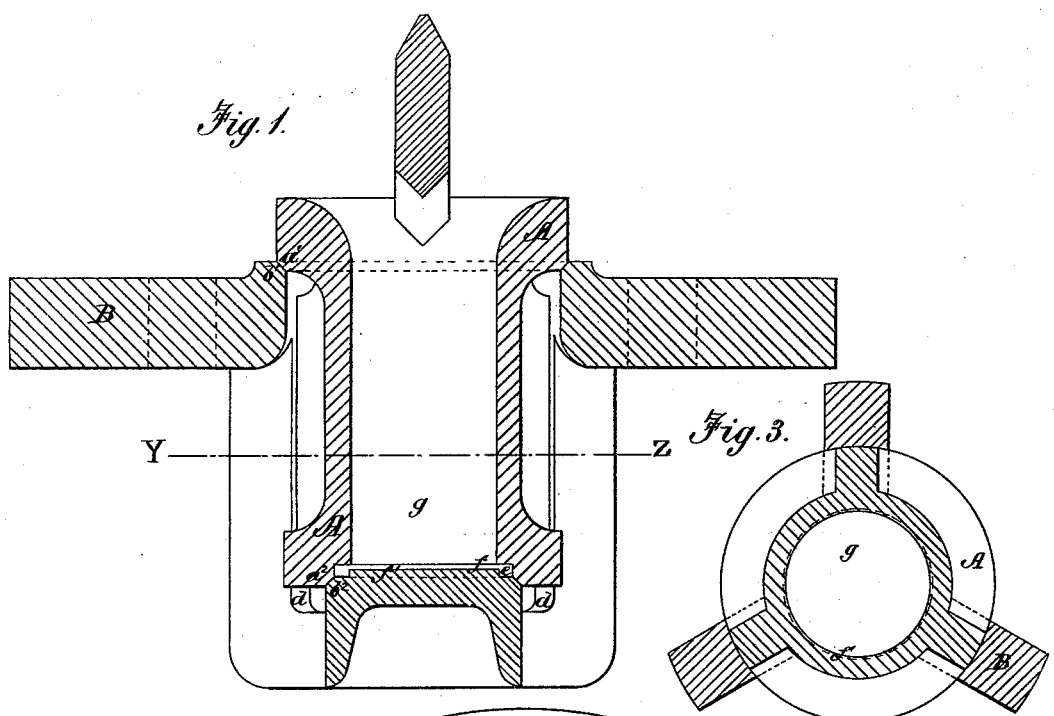
Fig. 1.
Fig. 3.
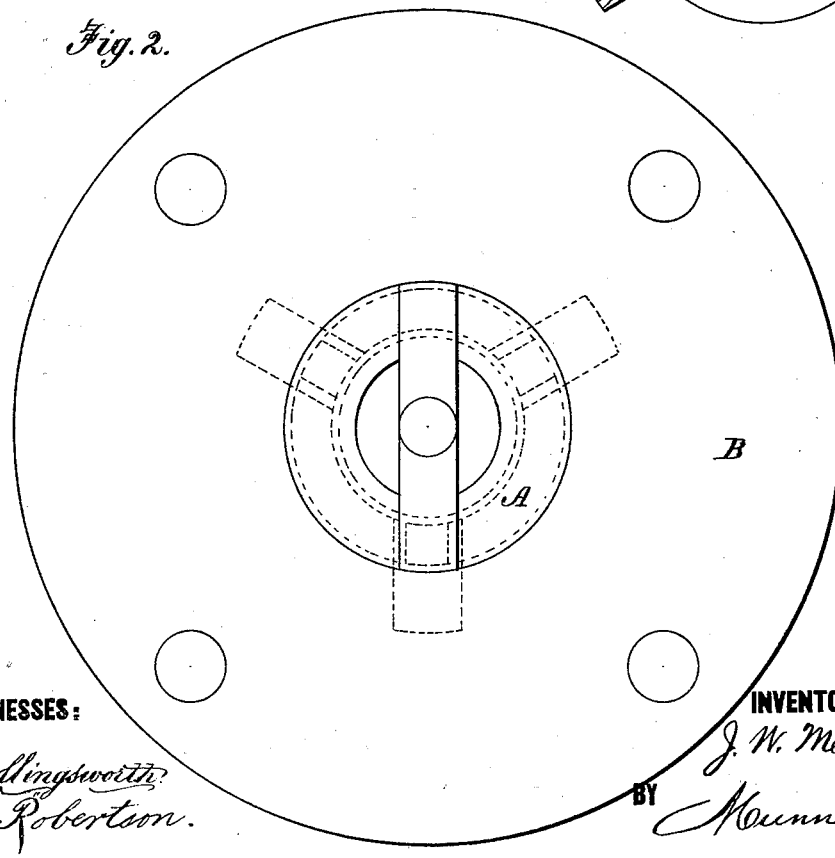
Fig. 2.
WITNESSES:
W. W. Hollingsworth
A. B. Robertson.
INVENTOR:
J. W. Melling
BY
Munn & Co.
ATTORNEYS.

J. W. MELLING.
SAFETY AND RELIEF VALVE.

No. 170,757.

2 Sheets—Sheet 2.

Patented Dec. 7, 1875.

WITNESSES:
W. W. Hollingsworth.
A. B. Robertson.

INVENTOR:
J. W. Melling
BY
Munn & Co.
ATTORNEYS.

UNITED STATES PATENT OFFICE.

JOHN WILLIAM MELLING, OF BIRKETT BANK, WIGAN, ENGLAND.

IMPROVEMENT IN SAFETY AND RELIEF VALVES.

Specification forming part of Letters Patent No. 170,757, dated December 7, 1875; application filed November 3, 1875.

*To all whom it may concern:*

Be it known that I, JOHN WILLIAM MELLING, of Birkett Bank, Wigan, in the county of Lancaster, in England, engineer, have invented certain new and useful Improvements in Safety and Relief Valves; and I hereby declare the following to be a full, clear, and exact description thereof, reference being had to the annexed drawings forming a part of this specification—that is to say:

These improvements are for the purpose of increasing the efficiency of safety and relief valves. In ordinary safety-valves the lift, and consequently the orifice for the escape of steam or other fluid, is very limited, more particularly with high pressures. Now, my invention consists in obviating the above defects by making the valve and seat with two faces, and by exposing only a part of the area of the valve to the pressure of the steam when the valve is closed; but when the blowing-off point is reached and the valve is slightly raised, the steam escapes in the ordinary way through one of the faces, and is admitted under the other face, and to another portion of the valve, thus acting on a greater area, this additional portion of the valve against which the steam acts being the main feature of my invention. By this means the valve is raised to the desired height against the resistance of the weight, or against the increasing resistance of the spring or springs, and notwithstanding the diminished pressure under the valve near to the escaping-orifice. The steam that is admitted under the second portion of the valve is allowed to escape through a hole or holes in the valve. This hole or holes, as well as the area of the second portion of the valve, is proportioned to suit the pressure of the steam, the height to which it is desired the valve shall be raised, and the mode of loading.

Figure 1 is a sectional elevation of one of my improved valves, and Fig. 2 is a plan. Fig. 3 is a section through the line Y Z on Fig. 1. A is the double valve, and B the double seat. The valve has the two faces, $a^1$ $a^2$, fitting on the corresponding faces $b^1$ $b^2$ on the seat. The upper and lower portions of the valve are connected by the tube and ribs, shown best in Fig. 3, and the upper and lower seats are connected by the ribs, also shown in Fig. 3. The valve A is guided in the seat B by the ribs above described, and by the circumference of the lower part of the valve. When the valve is closed the area exposed to lifting-pressure is the annular portion $d$, but when the valve is slightly raised the steam escapes in the ordinary way between the upper faces $a^1$ $b^1$, and also between the lower faces $a^2$ $b^2$. When the steam has filled the space $e$ it escapes through the narrow space $f$ and through the hole $g$. The escaping steam that passes between the lower faces $a^2$ $b^2$ is influenced by the width of the space $f$ between the valve and the boss or collar $f^1$ on the seat, and in a limited sense the area of the space $e$ on which the steam most efficiently acts, when the valve is only slightly raised, is regulated by the diameter of the boss or collar $f^1$. The steam is thus confined so as not to escape without assisting to raise the valve. The excess of pressure required to raise the valve to its full height depends on the width of the space $f$, diameter of the boss $f^1$, and area of the space $e$. The space $f$, and the diameter of the boss $f^1$, regulate the amount of the excess of pressure required to raise the valve to its full height. If the valve is to be loaded by a dead-weight or a weighted lever, the space $e$ is not required to be so large as when a spring or springs are used, because the dead-weight offers a constant resistance, while that of the springs increases; also, when used as a low-water valve, by increasing the space $e$ the valve may be made to blow down the steam to any desired pressure before closing.

Figure 5:
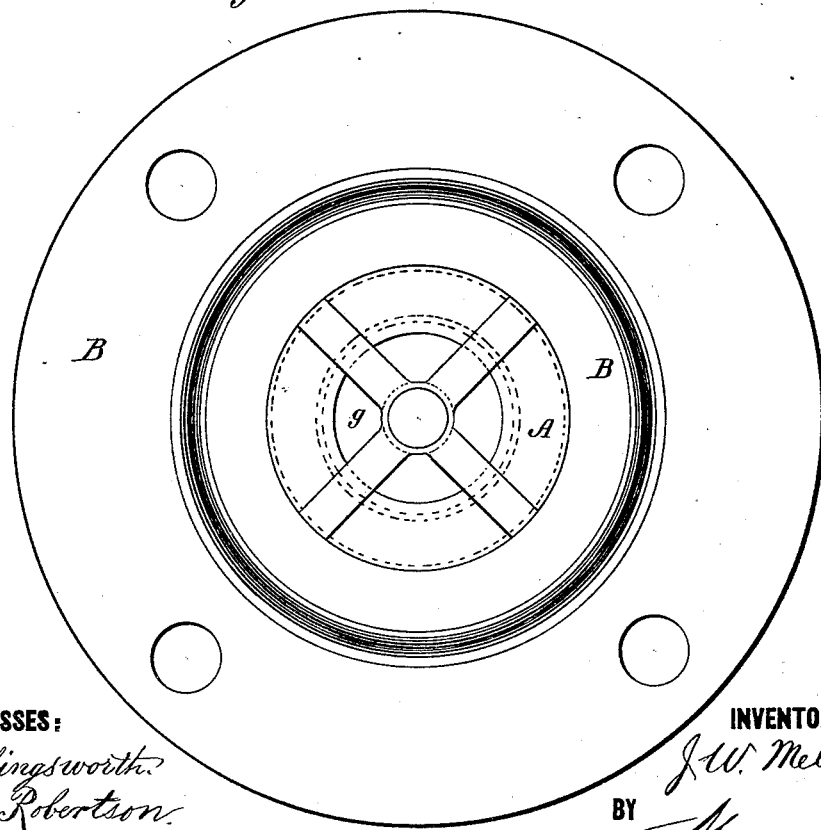

In Figs. 4 and 5 the same principle is carried out. When the blowing-off point is reached the steam that passes between the faces $a^2$ $b^2$ into the space $e$ has to pass through the orifice $f$ and the annular hole $g$ surrounding the spindle of the valve A. The spindle is attached to the valve by the cross-bars shown in the plan. A groove or grooves are cut in the spindle to allow steam to get freely under it to help to raise the valve. In smaller valves of this kind holes are drilled in the solid top as substitutes for the annular hole $g$.

These improvements have the following advantages: First, that the valve can be made to rise to any desired height irrespective of the mode of loading; second, that the steam has a free escape from the outer face, and the steam escaping from the inner face is only partially checked; third, that when used as a low-water valve the area of the space $e$ can be so proportioned that when, by the sinking of the float, or the action of other mechanism, the valve is slightly raised, so that steam gains access to the space $e$, the valve will then rise to its full height and allow the steam to blow off until the steam is reduced to the desired pressure before closing.

Having thus stated the nature of my invention, and described two modes of performing the same, I wish to observe that I do not intend to limit myself to the details given; nor do I claim the use of a double-faced valve, as valves with two faces have before been used, but not with any compensating part or additional area to answer the purpose of, and similar to, the space $e$.

What I claim herein as new, and desire to secure by Letters Patent of the United States, is—

The valve and seat A B, having faces $a^1\ b^1\ a^2\ b^2\ d$, spaces $e\ f$, collar $f^1$, and annular hole $g$, as and for the purpose described.

In testimony whereof I have hereunto set my hand before two subscribing witnesses.

JOHN WILLIAM MELLING.

Witnesses:
  W. B. BARLOW,
      Manchester.
  E. S. BARLOW,
      Manchester.